United States Patent
Ueda et al.

(10) Patent No.: US 12,243,239 B2
(45) Date of Patent: Mar. 4, 2025

(54) PROJECTION CONTROLLING APPARATUS AND PROJECTION SYSTEM

(71) Applicant: NTT DOCOMO, INC., Chiyoda-ku (JP)

(72) Inventors: Kensuke Ueda, Chiyoda-ku (JP); Nobutaka Matsushima, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 375 days.

(21) Appl. No.: 17/631,839

(22) PCT Filed: Aug. 12, 2020

(86) PCT No.: PCT/JP2020/030667
§ 371 (c)(1),
(2) Date: Jan. 31, 2022

(87) PCT Pub. No.: WO2021/039395
PCT Pub. Date: Mar. 4, 2021

(65) Prior Publication Data
US 2022/0277460 A1    Sep. 1, 2022

(30) Foreign Application Priority Data
Aug. 30, 2019    (JP) .................. 2019-158755

(51) Int. Cl.
*G06T 7/136* (2017.01)
*G06T 7/11* (2017.01)
(52) U.S. Cl.
CPC ............... *G06T 7/136* (2017.01); *G06T 7/11* (2017.01); *G06T 2207/30196* (2013.01)

(58) Field of Classification Search
CPC . G06T 7/136; G06T 7/11; G06T 2207/30196; G06T 7/521; H04N 5/74;
(Continued)

(56) References Cited

U.S. PATENT DOCUMENTS 9,332,208 B2 *   5/2016   Hayashi ................. G03B 17/54
2014/0253511 A1 *  9/2014  Yagishita ............... G06F 3/0425
                                                               345/175
(Continued)

FOREIGN PATENT DOCUMENTS

EP           2693103 A1 *   2/2014  ............. F21V 33/00
JP           2005-303493 A   10/2005
(Continued)

OTHER PUBLICATIONS

Office Action issued Apr. 4, 2023, in corresponding Japanese Patent Application No. 2021-542716 (with English Translation), 7 pages.
(Continued)

*Primary Examiner* — Utpal D Shah
*Assistant Examiner* — Jack Peter Kraynak
(74) *Attorney, Agent, or Firm* — Oblon, McClelland, Maier & Neustadt, L.L.P.

(57) ABSTRACT

A projection controlling apparatus includes a determiner configured to determine whether a hand-held object that is an object held by a hand is present in a captured image represented by captured image data generated by capturing a projection region onto which a projector projects a projected image; and a projection controller configured to prohibit the projected image from being projected onto the hand-held object in the projection region in response to a determination by the determiner that the hand-held object is present in the captured image.

9 Claims, 6 Drawing Sheets

(58) Field of Classification Search
CPC . G06N 20/00; G06N 3/02; G06N 3/08; G06F 3/011; G06F 3/01
See application file for complete search history.

(56) References Cited

U.S. PATENT DOCUMENTS

| | | | | |
|---|---|---|---|---|
| 2015/0244997 | A1* | 8/2015 | Masuko | G06T 11/40 348/747 |
| 2016/0191877 | A1* | 6/2016 | Ono | G09F 19/18 348/744 |
| 2019/0302964 | A1* | 10/2019 | Kyosuna | H04N 9/3155 |
| 2020/0257406 | A1* | 8/2020 | Lin | G06T 3/40 |

FOREIGN PATENT DOCUMENTS

| | | | | |
|---|---|---|---|---|
| JP | 2009-48022 | A | | 3/2009 |
| JP | 2013-33206 | A | | 2/2013 |
| JP | 2015041233 | A * | | 3/2015 |
| JP | 2016187116 | A * | | 10/2016 |
| JP | 2018109899 | A * | 7/2018 | ........... G06F 3/0418 |
| JP | 6456551 | B1 * | 1/2019 | ........... G06T 19/00 |
| WO | WO-2014010251 | A1 * | 1/2014 | ........... G01B 11/002 |
| WO | WO-2018099247 | A1 * | 6/2018 | |

OTHER PUBLICATIONS

International Search Report mailed on Nov. 2, 2020 in PCT/JP2020/030667 filed on Aug. 12, 2020, 2 pages.

* cited by examiner

PROJECTION CONTROLLING APPARATUS AND PROJECTION SYSTEM

TECHNICAL FIELD

The present invention relates to a projection controlling apparatus and to a projection system.

BACKGROUND ART

Patent Document 1 discloses a technique capable of prohibiting projection of an image onto an obstacle near a screen. In this technique, an object for which the distance to the screen is greater than or equal to a threshold (30 cm) is detected as an obstacle.

RELATED ART DOCUMENT

Patent Document

Patent Document 1: Japanese Patent Application Laid-Open Publication No. 2013-33206

SUMMARY OF THE INVENTION

Problem to be Solved by the Invention

In the technique described in Patent Document 1, an image is projected onto an object for which the distance to the screen is less than the threshold. Therefore, for example, when a distance between an object, such as a book held in a user's hand, and the screen, is less than the threshold, if an image is projected onto the object, there may be a problem in that the user may have difficulty seeing the object.

It is an object of the present invention to provide a technique capable of preventing occurrence of a problem caused by the projected image with respect to visibility of an object held in a user's hand.

Means of Solving the Problem

A projection controlling apparatus according to one aspect of the present invention includes a determiner configured to determine whether a hand-held object, which is an object held by a hand, is present in a captured image represented by captured image data generated by capturing a projection region onto which a projector projects a projected image; and a projection controller configured to prohibit the projected image from being projected onto the hand-held object in the projection region in response to a determination by the determiner that the hand-held object is present in the captured image.

Effect of the Invention

According to one aspect of the present invention, it is possible to prevent a problem caused by a projected image with respect to the visibility of an object held in a user's hand.

MODES FOR CARRYING OUT THE INVENTION

A. First Embodiment

A1. Projection System 1

Figure 1:
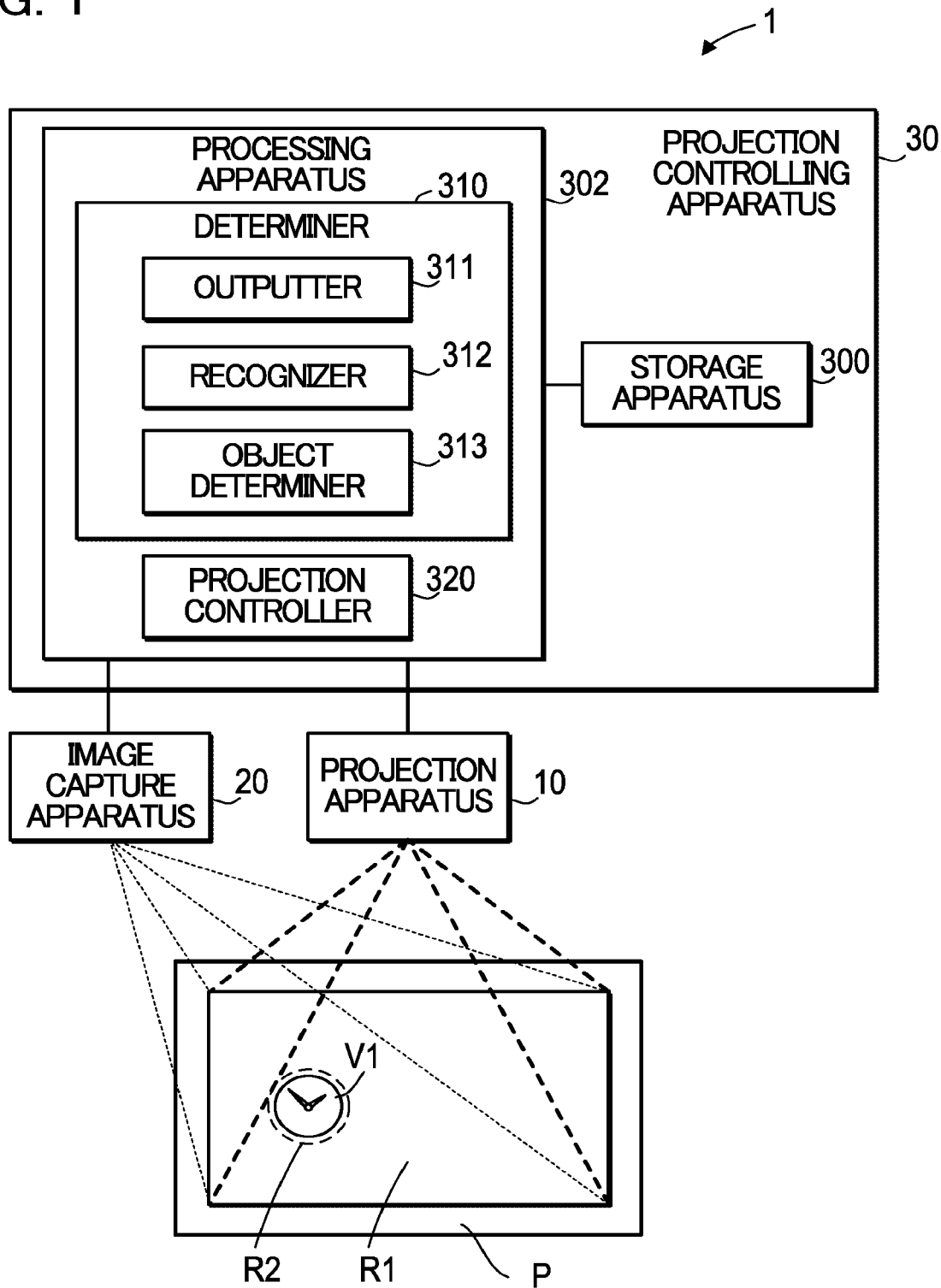
FIG. 1 is a diagram illustrating a projection system 1 according to a first embodiment.

FIG. 1 is a diagram illustrating a projection system 1 according to a first embodiment. The projection system 1 includes a projection apparatus 10, an image capture apparatus 20, and a projection controlling apparatus 30. In this specification, the term "apparatus" in the projection apparatus, the image capture apparatus, the projection controlling apparatus, a measurement apparatus described below, a storage apparatus described below, a processing apparatus described below, a peripheral apparatus described below, an arithmetic apparatus described below, and a central processing apparatus described below may be replaced by other terms such as "circuit," "device," or "unit".

The projection apparatus 10 is, for example, a projector. The projection apparatus 10 receives image information from the projection controlling apparatus 30. The projection apparatus 10 projects a projected image in accordance with the image information. Communication between the projection apparatus 10 and the projection controlling apparatus 30 may be by wired communication or by wireless communication. The projection apparatus 10 is an example of a projector.

The projection apparatus 10 projects the projected image, which includes an image of a virtual object V1 that realizes augmented reality, onto a region R1 on a projection surface P. The image of the virtual object V1 is projected onto a projection region R2 that is a part of the region R1. The projection surface P is, for example, a table. The projection surface P is not limited to a table, but may be, for example, a desk, a floor, a wall, or a screen.

Hereinafter, the image of the virtual object V1 (the projected image of the virtual object V1) will be referred to simply as "virtual object V1". In FIG. 1, an image of a clock is illustrated as an example of the virtual object V1.

The virtual object V1 is not limited to an image of a clock. For example, the virtual object V1 may be an image of an object different from a clock, or an image of letters. Instead of one virtual object V1, two or more virtual objects V1 may be used. The ratio of the virtual object V1 to the image projected by the projection apparatus 10 onto the region R1 is not limited to the ratio illustrated in FIG. 1, but may be higher or lower than the ratio illustrated in FIG. 1. The projected image projected by the projection apparatus 10 is not limited to an image including the virtual object V1. For example, the projected image projected by the projection apparatus 10 may be an image that does not realize augmented reality, for example, an image of a movie.

The image capture apparatus 20 is a camera that captures a projection destination (for example, the region R1) of the projected image. The image capture apparatus 20 is an example of an image capturer. The image capture apparatus 20 includes an optical system such as a lens, and an image capture element that converts light collected by the optical system into an electrical signal. The image capture element is, for example, a charge coupled device (CCD) image sensor. The image capture element is not limited to a CCD image sensor, but may also be, for example, a complementary metal oxide semiconductor (CMOS) image sensor. The image capture apparatus 20 may be provided in the projection apparatus 10 or may be independent of the projection apparatus 10.

The image capture apparatus 20 generates captured image data by capturing the projection destination (for example, the region R1 including the projection region R2) of the projected image. That is, the image capture apparatus 20 captures the projection region R2, for example. Note that "capturing the projection region R2" means "capturing at least the projection region R2". The image capture apparatus 20 transmits the captured image data to the projection controlling apparatus 30. Communication between the image capture apparatus 20 and the projection controlling apparatus 30 may be by wired communication or by wireless communication.

When an object is present that blocks at least a part of the virtual object V1 projected from the projection apparatus 10 onto the projection region R2, the object is almost present in a captured image represented by the captured image data.

The projection controlling apparatus 30 controls the projection apparatus 10 in accordance with the captured image data. The projection controlling apparatus 30 includes a storage apparatus 300 and a processing apparatus 302. Elements of the projection controlling apparatus 30 are connected to each other by one or more buses. Each element of the projection controlling apparatus 30 is configured by one or more devices.

The storage apparatus 300 is a recording medium that is readable by the processing apparatus 302. The storage apparatus 300 includes, for example, at least one of recording mediums such as a read-only memory (ROM), an erasable programmable ROM (EPROM), an electrically erasable programmable ROM (EEPROM), or a random access memory (RAM). The storage apparatus 300 stores a plurality of programs including a control program executed by the processing apparatus 302, and various data used by the processing apparatus 302.

The processing apparatus 302 includes one or more processors that control the projection controlling apparatus 30. The processing apparatus 302 is configured, for example, by one or more chips. For example, the processing apparatus 302 includes an interface for communicating with peripheral apparatuses and a central processing apparatus (central processing unit: CPU). The central processing apparatus includes an arithmetic apparatus and registers, etc. Some or all of functions of the processing apparatus 302 may be provided by a circuit such as a digital signal processor (DSP), an application specific integrated circuit (ASIC), a programmable logic device (PLD), and a field programmable gate array (FPGA). The processing apparatus 302 executes various processes in parallel or sequentially.

The processing apparatus 302 functions as a determiner 310 and a projection controller 320 by reading the control program from the storage apparatus 300 and executing the control program. The determiner 310 and the projection controller 320 are each an example of a functional block of the processing apparatus 302. The determiner 310 and the projection controller 320 may be each configured by a circuit such as a DSP, an ASIC, a PLD, or an FPGA.

The determiner 310 determines whether a hand-held object, which is an object held by a hand, is present in the captured image. The hand means a human hand. The determiner 310 includes an outputter 311, a recognizer 312, and an object determiner 313. The outputter 311, the recognizer 312, and the object determiner 313 are each an example of the functional block of the processing apparatus 302. The outputter 311, the recognizer 312, and the object determiner 313 may be each configured by a circuit such as a DSP, an ASIC, a PLD, or an FPGA.

The outputter 311 outputs a first determination result, which is a result of a determination as to whether the holding hand that is a hand holding an object, is present in the captured image, to the recognizer 312 and the object determiner 313.

In response to a determination that the holding hand is present in the captured image, the outputter 311 outputs a first determination result indicative of the holding hand being present in the captured image to the recognizer 312 and the object judgment unit 313. On the other hand, in response to a determination that the holding hand is not present in the captured image, the outputter 311 outputs a first determination result indicative of the holding hand not being in the captured image to the recognizer 312 and the object determiner 313.

A process of a determination as to whether the holding hand is present in the captured image may be performed by the outputter 311 or by an element (for example, a trained model) different from the outputter 311. The trained model will be described below.

As an example in which the outputter 311 performs the process of the determination as to whether the holding hand is present in the captured image, an example may be given in which the outputter 311 performs the process of the determination as to whether the holding hand is present in the captured image by using a rule base.

In response to the holding hand being present in the captured image, the outputter 311 outputs a first estimation result that is a result of an estimation of a region, in which the holding hand is present, in the captured image to the object determiner 313 and the projection controller 320.

The outputter 311 obtains the first estimation result from an element (for example a trained model) different from the outputter 311. The outputter 311 may perform a process of generating the first estimation result by using a rule base.

The outputter 311 obtains a second determination result, which is a result of a determination as to whether a non-holding hand that is a hand not holding an object is present in the captured image, from an element (for example a trained model) different from the outputter 311. The outputter 311 may perform a process of a determination as to whether the non-holding hand is present in the captured image by using a rule basis.

In response to the non-holding hand being present in the captured image, the outputter 311 outputs a second estimation result that is a result of an estimation of a region, in which the non-holding hand is present, in the captured image to the object determiner 313 and the projection controller 320.

The outputter 311 obtains the second estimation result from an element (for example, a trained model) different from the outputter 311. The outputter 311 may perform a process of generating the second estimation result by using a rule base.

The outputter 311 obtains a third determination result, which is a result of a determination as to whether a human body is present in the captured image, from an element (for example, a trained model) different from the outputter 311. The outputter 311 may perform a process of the determination as to whether the human body is present in the captured image by using a rule base. The human body may mean a part of a human body not including hands. Hereinafter, the human body means a part of the human body not including hands.

In response to the human body being present in the captured image, the outputter 311 outputs a third estimation result that is a result of an estimation of a region, in which the human body is present, in the captured image to the object determiner 313 and the projection controller 320.

The outputter 311 obtains the third estimation result from an element (for example, a trained model) different from the outputter 311. The outputter 311 may perform a process of generating the third estimation result by using a rule base.

In response to the first determination result indicative of the holding hand being present in the captured image, the recognizer 312 uses the captured image data to recognize at least one target recognition object differing from the hand. The at least one target recognition object includes each of various objects different from a hand. For example, a target recognition object is a book, a smartphone, a pen, an eraser, a calendar, etc. The target recognition object is predetermined. The recognizer 312 recognizes the target recognition object by using an element (for example, a trained model) different from the outputter 311. The recognizer 312 may recognize the target recognition object by using an image recognition method. The target recognition object is a candidate for the hand-held object.

The recognizer 312 outputs a fourth estimation result that is a result of an estimation of a region, in which the at least one target recognition object is present, in the captured image to the object determiner 313.

The recognizer 312 obtains the fourth estimation result from an element (for example, a trained model) different from the recognizer 312. The recognizer 312 may perform a process of generating the fourth estimation result by using a rule base.

In response to the first determination result indicative of the holding hand being present in the captured image, the object determiner 313 determines an object for which the distance to the holding hand is shortest from among the at least one target recognition object recognized by the recognizer 312, as the hand-held object.

The distance between the target recognition object and the holding hand is, for example, the distance between the target recognition object and the holding hand in the captured image. The distance between the target recognition object and the holding hand in the captured image is, for example, the distance between the position of the center of gravity of the target recognition object on the captured image and the position of the center of gravity of the holding hand in the captured image.

The object determiner 313 determines the position of the center of gravity of the holding hand in the captured image using the first estimation result indicative of the region, in which the holding hand is present, in the captured image. Furthermore, the object determiner 313 determines the position of the center of gravity of the target recognition object in the captured image using the fourth estimation result that is the result of the estimation of the region, in which the target recognition object is present, in the captured image. The distance between the target recognition object and the holding hand in the captured image may be the distance between any one point of the target recognition object in the captured image and any one point of the holding hand in the captured image.

In response to a determination of the hand-held object, the object determiner 313 determines that the hand-held object is present in the captured image. In response to the first determination result indicative of the holding hand being present in the captured image, the object determiner 313 may determine that the hand-held object is present in the captured image. In response to the first determination result indicative of the holding hand not being in the captured image, the object determiner 313 determines that the hand-held object is not present in the captured image. The object determiner 313 outputs a fifth estimation result that is a result of an estimation of a region, in which the hand-held object is present, in the captured image to the projection controller 320.

The projection controller 320 controls the provision of the image information to the projection apparatus 10. For example, the projection controller 320 prohibits the projection of the virtual object V1 onto the hand-held object in the projection destination in response to a determination by the determiner 310 that the hand-held object is present in the captured image.

In an example, in response to the region onto which the virtual object V1 is projected overlapping with at least a part of the region in which the hand-held object is present, the projection controller 320 stops providing the image information to the projection apparatus 10. As a result, the projection of the virtual object V1 onto the hand-held object is prevented.

In response to the region onto which the virtual object V1 is projected not overlapping with any part of the region in which the hand-held object is present, the projection controller 320 maintains a situation in which the region on which the virtual object V1 is projected does not overlap with any part of the region in which the hand-held object is present. Thus, the projection of the virtual object V1 onto the hand-held object is prevented.

The projection controller 320 determines the region onto which the virtual object V1 is projected, using the image information that is the origin of the projected image. The projection controller 320 determines the region in which the hand-held object is present, using the fifth estimation result that is the result of the estimation of the region, in which the hand-held object is present, in the captured image.

A2. Determiner 310 Including Trained Models

Figure 2:
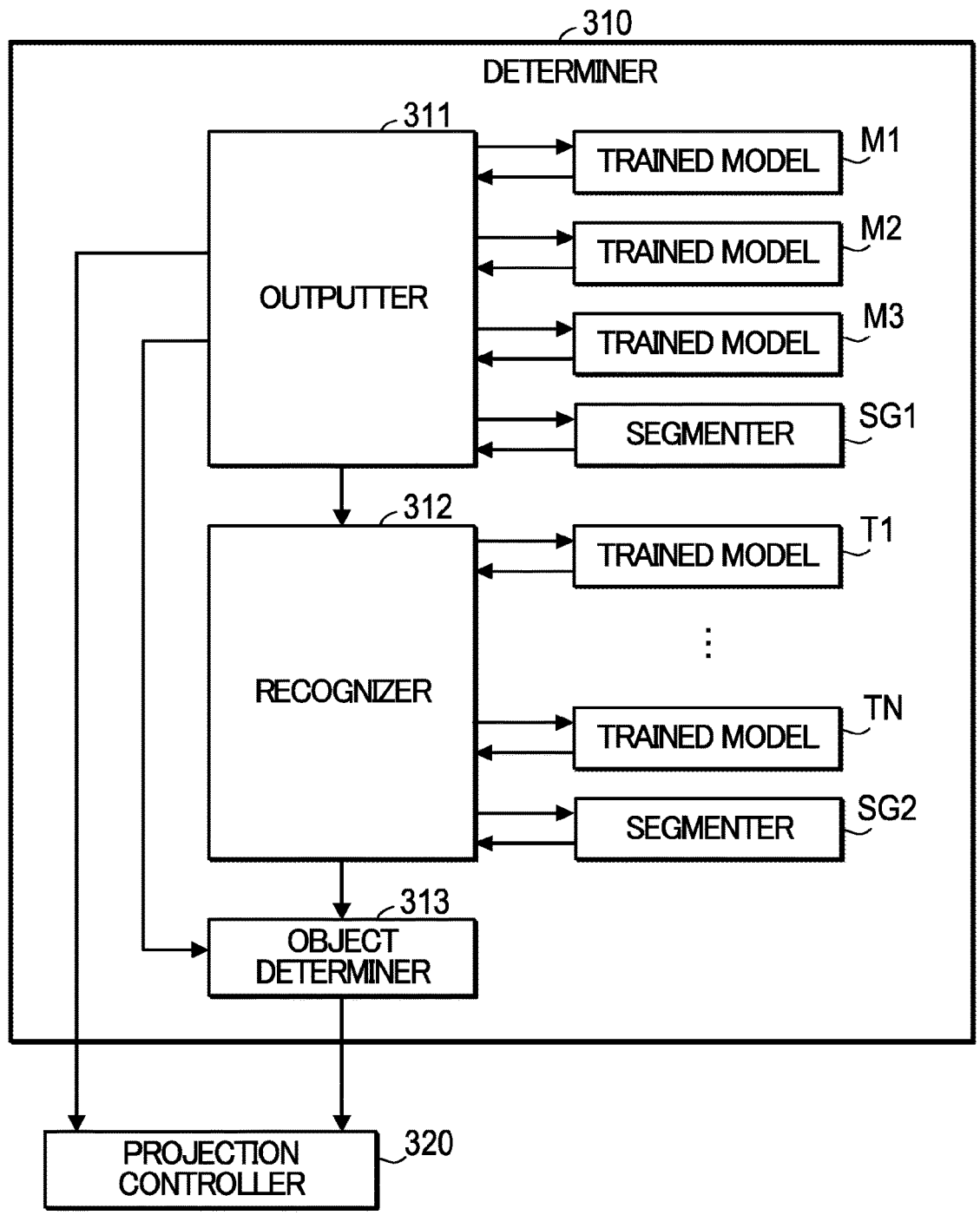
FIG. 2 is a diagram illustrating an example of a determiner 310.

FIG. 2 is a diagram illustrating an example of a determiner 310 including both trained models used by the outputter 311 and trained models used by the recognizer 312.

The determiner 310 is not limited to the configuration illustrated in FIG. 2. For example, the trained models illustrated in FIG. 2 may be in an element different from the determiner 310, or more specifically, in an element not included in the projection system 1.

However, when the trained models illustrated in FIG. 2 are included in the configuration of the projection system 1, for example, in the determiner 310, the captured image data that may be treated as the user's personal information is not leaked outside the projection system 1. Therefore, the user's personal information can be protected.

The determiner 310 illustrated in FIG. 2 includes trained models M1 to M3, a segmenter SG1, trained models T1 to TN, and a segmenter SG2, in addition to the outputter 311, the recognizer 312, and the object determiner 313. N is an integer of two or more. The trained models M1 to M3, the segmenter SG1, the trained models T1 to TN, and the segmenter SG2 are each an example of a functional block of the processing apparatus 302.

A3. Trained Model M1

The trained model M1 is a trained model having been trained to learn a relationship between image data and determination data indicating whether a holding hand is present in an image represented by the image data. The trained model M1 is specified by coefficients K1 that are identified by machine learning using pieces of training data TM1.

The training data TM1 is a combination of the image data and the determination data (label) indicating whether a holding hand is present in the image represented by the image data. One example of the training data TM1 is a combination of image data representative of an image in which a holding hand is present and determination data indicating that a holding hand is present in the image represented by the image data. Another example of the training data TM1 is a combination of image data representative of an image in which a holding hand is not present and determination data indicating that a holding hand is not present in the image represented by the image data.

As the trained model M1, a neural network, typically a deep neural network, is used, for example. The trained model M1 generates output data indicating whether the holding hand is present in the captured image represented by the captured image data in accordance with the captured image data input from the outputter 311.

Next, the trained model M1 is described from a different perspective.

The trained model M1 is a statistical model (for example, a neural network), or more particularly, a functional block, implemented by the processing apparatus (a computer, for example) 302 to generate output B in accordance with input A.

The trained model M1 is realized in the processing apparatus 302 by a combination of a program (for example, a program module comprising artificial intelligence software) that causes the processing apparatus 302 to perform an operation to determine the output B from the input A, and the coefficients K1 that are applied to the operation. The program and the coefficients K1 are stored in the storage apparatus 300.

The coefficients K1 are optimized by prior machine learning (deep learning) using the pieces of training data TM1 in which input A and output B are made to correspond to each other. In other words, the trained model M1 is a statistical model having been trained to learn a relationship between the input A and the output B, as described above.

By performing an operation applying the coefficients K1 and a predetermined response function to an unknown input A, the processing apparatus 302 generates a valid output B for the input A in accordance with a trend (a relationship between the input A and the output B) extracted from the pieces of training data TM1.

The trained model M1 uses "the captured image data" as the input A and uses "data indicating whether the holding hand is present in the captured image represented by the captured image data" as the output B.

The trained model M1 may be realized by a processor for neural networks, such as a Tensor Processing Unit and a Neural Engine, for example.

The outputter 311 inputs the captured image data to the trained model M1. The outputter 311 receives output data of the trained model M1. The outputter 311 uses the output data of the trained model M1 as the first determination result.

A4. Trained Model M2

The trained model M2 is a trained model having been trained to learn a relationship between image data and determination data indicating whether a non-holding hand is present in an image represented by the image data. The trained model M2 is specified by coefficients K2 that are determined by machine learning using pieces of training data TM2. The training data TM2 is a combination of the image data and the determination data (labels) indicating whether the non-holding hand is present in the image represented by the image data.

The trained model M2 is different from the trained model M1 in that the trained model M2 uses the training data TM2, and that the trained model M2 uses "the captured image data" as the input A and uses "the data indicating whether the non-holding hand is present in the captured image" as the output B.

The outputter 311 inputs the captured image data to the trained model M2. The outputter 311 receives output data of the trained model M2 as the second determination result.

A5. Trained Model M3

The trained model M3 is a trained model having been trained to learn a relationship between image data and determination data indicating whether a human body is present in an image represented by the image data. The trained model M3 is specified by coefficients K3 that are determined by machine learning using pieces of training data TM3. The training data TM3 is a combination of image data and a determination result (label) indicating whether the human body is present in an image represented by the image data.

The trained model M3 is different from the trained model M1 in that the trained model M3 uses the training data TM3, and in that the trained model M3 uses "the captured image data" as the input A and uses "the data indicating whether the human body is present in the captured image" as the output B.

The outputter 311 inputs the captured image data to the trained model M3. The outputter 311 receives output data of the trained model M3 as the third determination result.

A6. Segmenter SG1

The segmenter SG1 estimates the region in which a holding hand is present in the captured image, the region in which a non-holding hand is present in the captured image, and the region in which a human body is present in the captured image, using a segmentation method such as semantic segmentation.

The semantic segmentation method is realized, for example, by a trained model (for example, a neural network). The trained model realizing the semantic segmentation method uses image data as input, and uses, as output, a combination of identification information of a target detection object (for example, a holding hand) and a mask region indicating a region, in which the target detection object is present, in an image represented by the image data. In this case, training data is a combination of image data and a label. The label is a pair of the mask area indicating the region in which the target detection object is present and the identification information of the target detection object.

The segmenter SG1 has a trained model that uses the holding hand as the target detection object, a trained model that uses the non-holding hand as the target detection object, and a trained model that uses the human body as the target detection object.

The outputter 311 inputs the captured image data to the trained models in the segmenter SG1. The outputter 311 receives output data of the trained models in the segmenter SG1. The outputter 311 receives output data of the trained model that uses the holding hand as the target detection object, as the first estimation result. The outputter 311 receives output data of the trained model that uses the non-holding hand as the target detection object, as the second estimation result. The outputter 311 receives output data of the trained model that uses the human body as the target detection object, as the third estimation result.

A7. Trained Models T1 to TN

Hereinafter, any trained model among the trained models T1 to TN is referred to as a "trained model Tm".

A8. Trained Model Tm

The trained model Tm is a trained model having been trained to learn a relationship between image data and determination data indicating whether a target recognition object, which is an object different from a hand, is present in an image represented by the image data.

The target recognition object that is used in the trained model Tm is different from each of target recognition objects that are used as trained models other than the trained model Tm among the trained models T1 to TN. For example, when the trained models T1 to TN are composed of trained models T1 and T2, a target recognition object that is used in the trained model T1 is different from a target recognition object that is used in the trained model T2. In an example, the target recognition object that is used in the trained model T1 is a "book" and the target recognition object that is used in the trained model T2 is a "smartphone".

The trained model Tm is specified by coefficients K that are determined by machine learning using pieces of training data TTm. The training data TTm is a combination of image data and determination data (labels) indicating whether the target recognition object that is used in the trained model Tm is present in the image represented by the image data.

The trained model Tm is different from the trained model M1 in that the trained model Tm uses the training data TTm, and in that the trained model Tm uses "the captured image data" as the input A and uses "the data indicating whether the target recognition object that is used in the trained model Tm is present in the captured image" as the output B.

The recognizer 312 inputs the captured image data to the trained model Tm. The recognizer 312 receives output data of the trained model Tm. In response to the output data of the trained model Tm indicating that the target recognition object that is used in the trained model Tm is present in the captured image, the recognizer 312 recognizes the target recognition object. On the other hand, in response to the output data of the trained model Tm indicating that the target recognition object that is used in the trained model Tm is not present in the captured image, the recognizer 312 does not recognize the target recognition object.

A9. Segmenter SG2

The segmenter SG2 estimates the region in which a target recognition object is present in the captured image for each type of target recognition objects, using a segmentation method such as semantic segmentation. The types of target recognition objects are, for example, "books" and "smart phones". The segmenter SG2 has a trained model that realizes the semantic segmentation method for each type of target recognition object.

The recognizer 312 inputs the captured image data to the trained models in the segmenter SG2. The recognizer 312 receives the output data of the trained models in the segmenter SG2 as the fourth estimation result.

A10. Operation of Projection System 1

Figure 3:
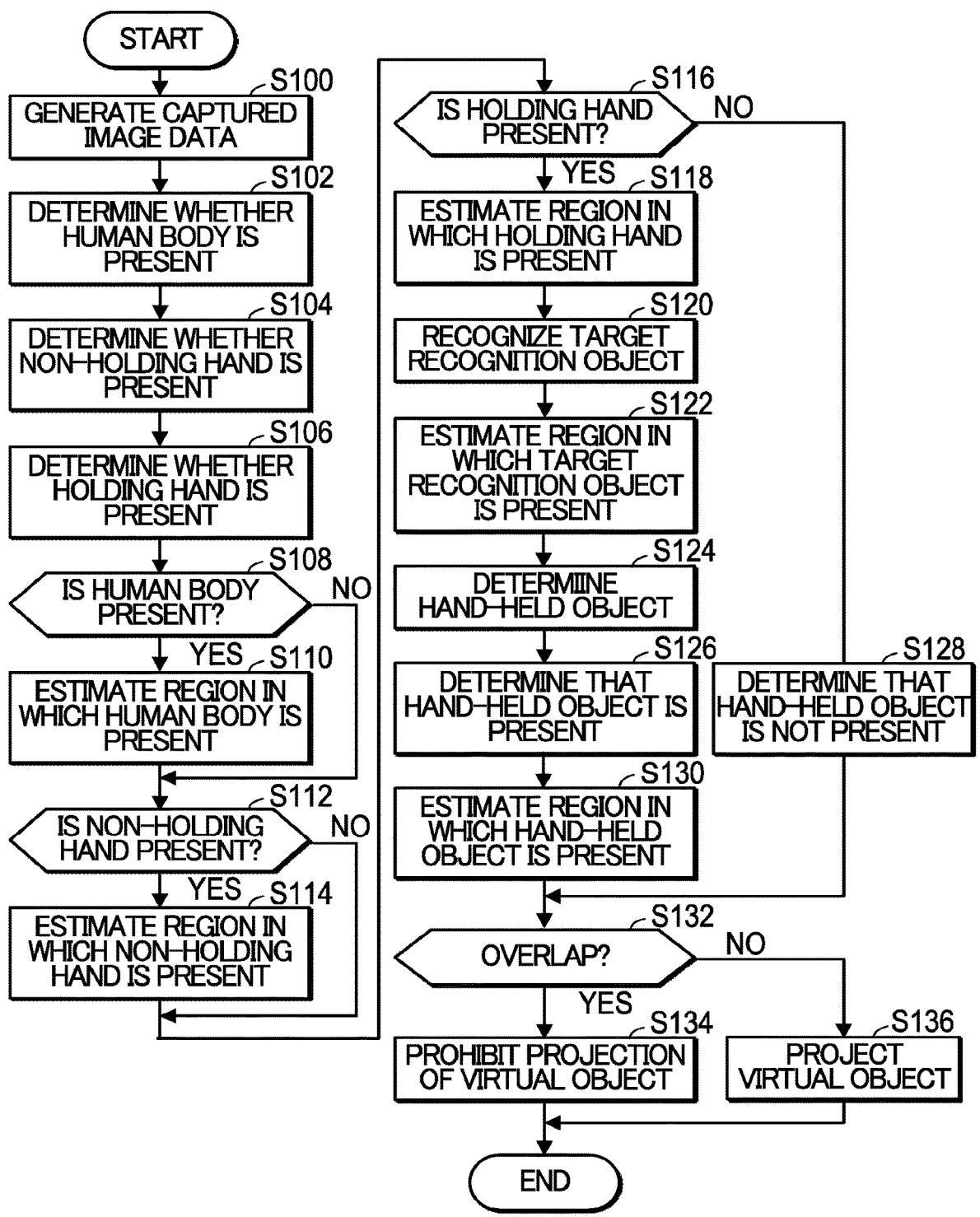
FIG. 3 is a diagram illustrating an example of an operation of the projection system 1.

FIG. 3 is a diagram illustrating an example of an operation of the projection system 1. It is assumed that, at the start of the operation illustrated in FIG. 3, the projection controller 320 provides the image information to the projection apparatus 10, and the projection apparatus 10 projects the virtual object V1 onto the projection region R2 in accordance with the image information. It is also assumed that the determiner 310 illustrated in FIG. 2 is used.

The image capture apparatus 20 generates the captured image data by capturing the region R1 (step S100). The image capture apparatus 20 transmits the captured image data to the processing apparatus 302, specifically the outputter 311 and the recognizer 312.

The outputter 311 inputs the captured image data to the trained model M3. The trained model M3 determines whether the human body is present in the captured image in accordance with the captured image data (step S102). The trained model M3 provides the output data indicating whether the human body is present in the captured image to the outputter 311.

Then, the outputter 311 inputs the captured image data to the trained model M2. The trained model M2 determines whether the non-holding hand, which is a hand that is not holding an object, is present in the captured image in accordance with the captured image data (step S104). The trained model M2 provides the output data indicating whether the non-holding hand is present in the captured image to the outputter 311.

Then, the outputter 311 inputs the captured image data to the trained model M1. The trained model M1 determines whether the holding hand, which is a hand holding an object, is present in the captured image in accordance with the captured image data (step S106). The trained model M1 provides the output data indicating whether the holding hand is present in the captured image to the outputter 311.

The order of the steps S102 to S106 can be changed as appropriate. The step S102 is performed before step S108 described below. The step S104 is performed before step S112, described below. The step S106 is performed before step S116, described below.

In response to the output data of the trained model M3 indicating that the human body is present in the captured image (Step S108: YES), the outputter 311 inputs the captured image data to the segmenter SG1 (specifically, the trained model that uses the human body as the target detection object). The segmenter SG1 estimates the region, in which the human body is present, in the captured image in accordance with the captured image data (step S110). The segmenter SG1 provides the third estimation result indicating the region, in which the human body is present, in the captured image to the outputter 311. The outputter 311 outputs the third estimation result to the projection controller 320.

In response to the output data of the trained model M3 indicating that the human body is not present in the captured image (step S108: NO), the step S110 is skipped. Therefore, it is possible to avoid a useless process of estimating the region in which the human body is present in the captured image when the human body is not present in the captured image.

Then, in response to the output data of the trained model M2 indicating that the non-holding hand is present in the captured image (Step S112: YES), the outputter 311 inputs the captured image data to the segmenter SG1 (specifically, the trained model that uses the non-holding hand as the target detection object). The segmenter SG1 estimates the region, in which the non-holding hand is present, in the captured image in accordance with the captured image data (step S114). The segmenter SG1 provides the second estimation result indicating the region, in which the non-holding hand is present, in the captured image to the outputter 311. The outputter 311 outputs the second estimation result to the projection controller 320.

In response to the output data of the trained model M2 indicating that the non-holding hand is not present in the captured image (step S112: NO), the step S114 is skipped. Therefore, it is possible to avoid a useless process of estimating the region in which the non-holding hand is present in the captured image when the non-holding hand is not present in the captured image.

Then, in response to the output data of the trained model M1 indicating that the holding hand is present in the captured image (Step S116: YES), the outputter 311 inputs the captured image data to the segmenter SG1 (specifically, the trained model that uses the holding hand as the target detection object). The segmenter SG1 estimates the region, in which the holding hand is present, in the captured image in accordance with the captured image data (step S118). The segmenter SG1 provides the first estimation result indicating the region, in which the holding hand is present, in the captured image to the outputter 311. The outputter 311 outputs the first estimation result to the object determiner 313 and the projection controller 320.

Then, the recognizer 312 uses image data to recognize the target recognition object that is an object different from the hand (step S120).

In step S120, the recognizer 312 first inputs the captured image data to each of the trained models T1 to TN. Each of the trained models T1 to TN determines whether the target recognition object is present in the captured image in accordance with the captured image data. Each of the trained models T1 to TN provides the output data indicating whether the target recognition object is present in the captured image to the recognizer 312. The recognizer 312 recognizes the target recognition object in accordance with the output data of the trained models T1 to TN. For example, in response to a determination that a book and a smartphone is present in the captured image on the basis of the output data of the trained models T1 to TN, the recognizer 312 recognizes the book and the smartphone as the target recognition objects. The book and the smartphone are examples of the target recognition objects. The target recognition objects are not limited to the book and the smartphone, and they may be changed as appropriate.

Hereinafter, it is assumed that the recognizer 312 recognizes the book and the smartphone as the target recognition objects. In this case, either the book or the smartphone corresponds to the hand-held object, which is an object held by the hand.

Then, the recognizer 312 inputs the captured image data to the trained model corresponding to each of the target recognition objects recognized by the recognizer 312 among the trained models in the segmenter SG2. Specifically, the recognizer 312 inputs the captured image data to each the trained model corresponding to the book and the trained model corresponding to the smartphone among the trained models in the segmenter SG2.

The segmenter SG2 estimates each region, in which the target recognition object (each of the book and the smartphone) is present in the captured image in accordance with the captured image data (step S122). The segmenter SG2 provides the output data indicating the estimation result to the recognizer 312. The recognizer 312 receives the output data of the segmenter SG2 as the fourth estimation result. The recognizer 312 outputs the fourth estimation result to the object determiner 313.

Then, the object determiner 313 determines the object for which the distance to the holding hand is shortest among the target recognition objects as the hand-held object (step S124). For example, the object determiner 313 determines the target recognition object for which the distance to the holding hand is shortest in the captured image among the target recognition objects as the hand-held object.

In an example, the object determiner 313 first uses the first estimation result to determine the region of the holding hand in the captured image. Next, the object determiner 313 uses the fourth estimation result to determine the region of each target recognition object in the captured image. Then, the object determiner 313 determines the position of the center of gravity of the holding hand in the captured image in accordance with the region of the holding hand in the captured image. Furthermore, the object determiner 313 determines the position of the center of gravity of each target recognition object in the captured image in accordance with the region of each target recognition object in the captured image. Then, the object determiner 313 determines, among the target recognition objects, the target recognition object having the shortest distance between the position of the center of gravity of the target recognition object in the captured image and the position of the center of gravity of the holding hand in the captured image, as the hand-held object.

Then, the object determiner 313 determines that the hand-held object is present in the captured image (step S126). When the holding hand is not present in the captured image (step S116: NO), the object determiner 313 determines that the hand-held object is not present in the captured image (step S128).

In response to a determination that the hand-held object is present in the captured image, the object determiner 313 estimates the region, in which the hand-held object is present, in the captured image (step S130). For example, the object determiner 313 uses the region indicated by the fourth estimation result for the target recognition object determined as the hand-held object, as the region, in which the hand-held object is present, in the captured image. The object determiner 313 outputs data indicating the region, in which the hand-held object is present, in the captured image to the projection controller 320 as the fifth estimation result.

When the holding hand is not present in the captured image in step S116 (step S116: NO), steps S118 to S126 and step S130 are not executed. Therefore, when the holding hand is not present in the captured image, it is possible to avoid both a useless process of estimating the region in which the holding hand is present in the captured image and a useless process of estimating the region in which the hand-held object is present in the captured image.

Then, the projection controller 320 determines whether the projection region R2 of the virtual object V1 overlaps with at least one of the region in which the human body is present, the region in which the non-holding hand is present, the region in which the holding hand is present, or the region in which the hand-held object is present (step S132).

As illustrated in FIG. 1, the projection apparatus 10 projects the image including the virtual object V1 onto the region R1 in accordance with the image information provided by the projection controller 320. The image capture apparatus 20 generates the captured image data representative of the captured image by capturing the region R1. In other words, the image information represents the image to be projected onto the region R1, and the captured image data represents the captured image generated by capturing the region R1. Thus, the image represented by the image information and the captured image represented by the captured image data each represent the state of the region R1.

Therefore, the projection controller 320 uses the region of the virtual object V1 in the image represented by the image information as the projection region R2 of the virtual object V1, and uses the region indicated by the first estimation result, the region indicated by the second estimation result, the region indicated by the third estimation result, and the region indicated by the fifth estimation result as the region in which the holding hand is present, the region in which the non-holding hand is present, the region in which the human body is present, and the region in which the hand-held object is present, respectively.

When the projection controller 320 has not received at least one estimation result of the first estimation result, the second estimation result, the third estimation result, or the fifth estimation result, the projection controller 320 determines that the size of the region indicated by the at least one estimation result that has not been received is equal to zero.

When the projection region R2 of the virtual object V1 overlaps with the at least one of the region in which the human body is present, the region in which the non-holding hand is present, the region in which the holding hand is present, or the region in which the hand-held object is present, the projection controller 320 stops providing the image information to the projection apparatus 10. In other words, the projection controller 320 prohibits the projection of the virtual object V1 (step S134).

On the other hand, when the projection region R2 of the virtual object V1 does not overlap with any of the region in which the human body is present, the region in which the non-holding hand is present, the region in which the holding hand is present, or the region in which the hand-held object is present, the projection controller 320 keeps providing the image information to the projection apparatus 10. Therefore, the projection apparatus 10 projects the virtual object V1 onto the projection region R2 (step S136).

Figure 4:
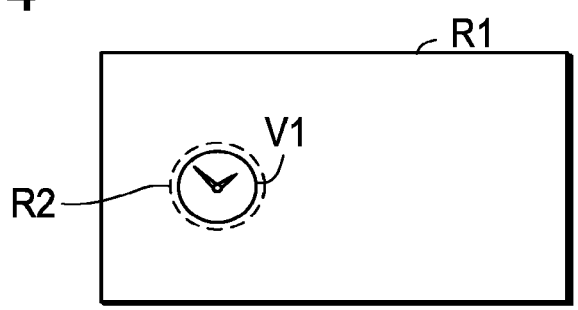
FIG. 4 is a diagram illustrating an example of projection of a virtual object V1.
Figure 5:
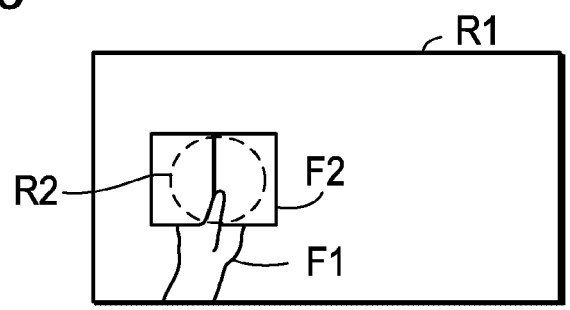
FIG. 5 is a diagram illustrating an example of preventing the projection of the virtual object V1.

Consequently, in a situation in which the virtual object V1 is being projected as illustrated in FIG. 4, in response to a book F2 held by a hand F1 entering in the projection region R2 as illustrated in FIG. 5, the projection of the virtual object V1 is prohibited.

The steps S102, S108, and S110 may be performed in an order different from the order illustrated in FIG. 3 as long as the steps S102, S108, and S110 are performed between the steps S100 and S132. The steps S104 and S112 to S114 may be performed in an order different from the order illustrated in FIG. 3 as long as the steps S104 and S112 to S114 are performed between the steps S100 and S132. The steps S106 and S116 to S130 may be performed in an order different from the order illustrated in FIG. 3 as long as the steps S106 and S116 to S130 are performed between the steps S100 and S132.

A11. Summary of First Embodiment

In the first embodiment, the determiner 310 determines whether the hand-held object is present in the captured image. In response to a determination that the hand-held object is present in the captured image, the projection controller 320 prohibits the projection of the virtual object V1 onto the hand-held object in the projection region.

Therefore, it is possible to prevent problems caused by the projected image in the visibility of an object such as a book held by the user's hand. For example, when the user is holding a smartphone in the user's hand, the virtual object V1 is not projected onto the smartphone. Therefore, it is possible to prevent the visibility of the screen of the smartphone from being reduced by the virtual object V1. In addition, when the user is holding a colored pen in the user's hand, the virtual object V1 is not projected onto the colored pen. Therefore, it is possible to prevent the user from having difficulty recognizing the color of the colored pen due to the projection of the virtual object V1 onto the colored pen.

The outputter 311 outputs the first determination result indicating whether the holding hand is present in the captured image. The recognizer 312 recognizes the target recognition object by using the captured image data. In response to the first determination result indicating that the holding hand is present in the captured image, the object determiner 313 determines an object of which distance to the holding hand is shortest among the target recognition objects, as the hand-held object.

The hand-held object is held by the holding hand. Therefore, the object for which the distance to the holding hand is shortest among the target recognition objects is likely to be the hand-held object. Consequently, it is possible to determine the hand-held object with high accuracy according to this embodiment.

The outputter 311 inputs the captured image data to the trained model M1 having been trained to learn the relationship between image data and determination data indicating whether the holding hand is present in an image represented by the image data, and uses the output data of the trained model M1 as the first determination result. Therefore, it is possible to determine whether the holding hand is present with high accuracy.

The projection apparatus 10 projects the image including virtual object V1 for realizing augmented reality. For example, when the virtual object V1 that should be projected onto a specific place is projected onto the hand-held object, the user is confused about the perception of the augmented reality that the virtual object V1 is present at the specific place. Therefore, the user's sense of immersion in the augmented reality is diminished. According to the present embodiment, since the projection of the virtual object V1 onto the hand-held object is prevented, the user's perception of the augmented reality can be prevented from being confused.

B. Modifications

The following are examples of specific modifications on the embodiment described above. Two or more modifications freely selected from the following modifications may be combined with one another as long as no contradiction arises from such a combination.

B1. First Modification

Figure 6:
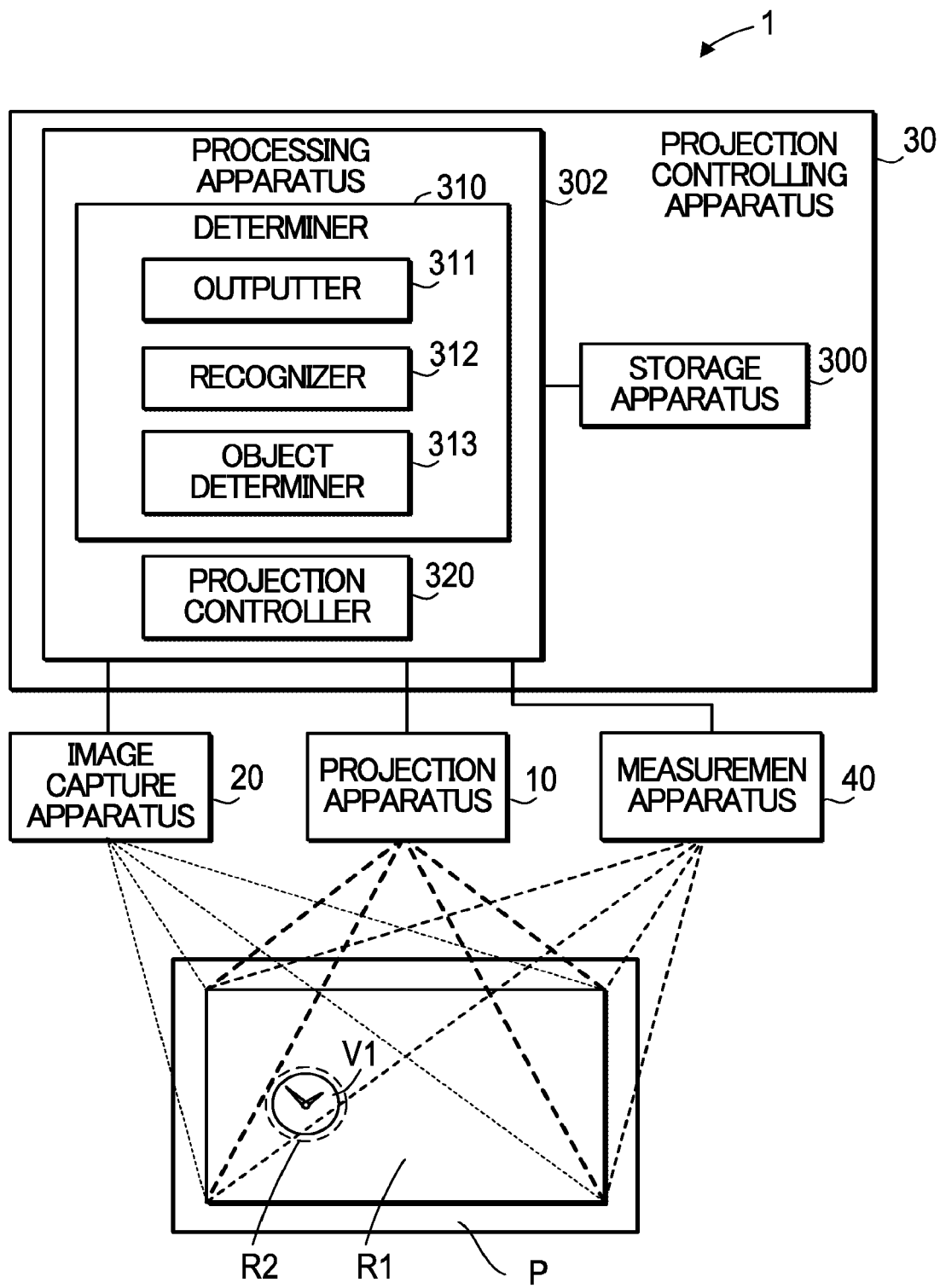
FIG. 6 is a diagram illustrating a first modification.

FIG. 6 is a diagram illustrating a first modification. In the first modification, the projection system 1 further includes a measurement apparatus 40. The determiner 310 illustrated in FIG. 2 may be used as the determiner 310 illustrated in FIG. 6.

The measurement apparatus 40 measures a distance from the measurement apparatus 40 to the holding hand and a distance from the measurement apparatus 40 to each target recognition object. The measurement apparatus 40 is an example of a range finder. The method by which the measurement apparatus 40 measures the distances is any well-known method of measuring distances. For example, the method by which the measurement apparatus 40 measures a distance is a method of measuring a distance in accordance with the parallax of two cameras, or a method of measuring a period of time from a point in time when the measurement apparatus 40 emits infrared light or the like to a target measurement object to a point in time when the measurement apparatus 40 receives the light reflected by the target measurement object. The position of the holding hand is determined in accordance with the first estimation result. The position of the target recognition object is determined in accordance with the fourth estimation result.

The object determiner 313 determines the object for which the distance to the holding hand is shortest among the target recognition objects as the hand-held object in accordance with the measurement results of the measurement apparatus 40 and the captured image data.

For example, when the target recognition objects include two or more objects for which the distances to the holding hand in the captured image are shortest among the target recognition object, the object determiner 313 determines the hand-held object as follows.

The object determiner 313 first determines, from among the distances measured by the measurement apparatus 40 for the two or more objects, a distance having the smallest difference from the distance to the holding hand measured by the measurement apparatus 40, as a relevant distance. Then, the object determiner 313 determines, among the two or more objects, an object for which the distance measured by the measurement apparatus 40 is equal to the relevant distance, as the hand-held object.

According to the first modification, even when only one hand-held object cannot be determined in a situation in which only the captured image data is used to determine the hand-held object from among the target recognition objects, only one hand-held object can be determined. Therefore, the accuracy of a determination of the hand-held object is improved compared to a configuration in which only the captured image data is used to determine the hand-held object from among the target recognition objects.

In the first modification, it is desirable that the object determiner 313 operate the measurement apparatus 40 only when the two or more target recognition objects, for which the distances to the holding hand in the captured image are shortest, are present. In this case, it is possible to operate the measurement apparatus 40 only a situation in which the measurement result of the measurement apparatus 40 is necessary. Therefore, it is possible to reduce unnecessary operation of the measurement apparatus 40.

B2. Second Modification

For example, in a situation in which a user compares the screen of a smartphone held in the user's hand with a book placed on the projection surface P, it is desirable to project the virtual object V1 onto neither the smartphone nor the book to ensure visibility of both the smartphone and the book. A second modification is a configuration that enables the virtual object V1 to be projected on neither the smartphone nor the book in the situation described above.

In the second modification, the object determiner 313 further determines a nearest object for which the distance to the hand-held object is shortest from among at least one remaining object that is at least one object other than the hand-held object among the target recognition objects. The projection controller 320 further prohibits the projection apparatus 10 from projecting the virtual object V1 onto the nearest object.

For example, the object determiner 313 determines an object for which the distance to the hand-held object in the captured image is shortest from among the at least one remaining object, as the nearest object. The distance from a remaining object to the hand-held object in the captured image is, for example, the distance between the position of the center of gravity of the remaining object in the captured image and the position of the center of gravity of the hand-held object in the captured image. The distance between the remaining object and the hand-held object in the captured image may be the distance between any one point of the remaining object in the captured image and any one point of the hand-held object in the captured image.

Then, the object determiner 313 determines a region in which the nearest object is present. The method by which the object determiner 313 determines the region in which the nearest object is present is substantially the same as the method by which the object determiner 313 determines the region in which the hand-held object is present.

The projection controller 320 prohibits the projection of the virtual object V1 when the projection region R2 of the virtual object V1 overlaps with at least one of the region in which the human body is present, the regions in which the non-holding hand is present, the region in which the holding hand is present, the region in which the hand-held object is present, or the region in which the nearest object is present. The projection controller 320 obtains the region in which the nearest object is present from the object determiner 313.

The object for which the distance to the hand-held object is shortest among the remaining objects may be visible by the user. Therefore, according to the second modification, it is possible to reduce the projection of virtual object V1 onto the object that may be visible to the user. Consequently, it is possible to reduce visibility problems caused by the projection of virtual object V1 onto the object that may be visible to the user.

B3. Third Modification

The second modification prevents the virtual object V1 from being projected onto the object for which the distance to the hand-held object is shortest in the captured image among the remaining objects.

However, the object for which the distance to the hand-held object is shortest among the remaining objects may not be visible to the user together with the hand-held object when the distance to the hand-held object is greater than a predetermined distance.

Therefore, a third modification prohibits only the projection of virtual object V1 onto a target object for which the distance to the hand-held object is less than a threshold among the at least one remaining object.

Specifically, the object determiner 313 determines the target object, which is an object for which the distance to the hand-held object is less than the threshold, from among the at least one remaining object. The projection controller 320 further prohibits projection of virtual object V1 onto the target object.

For example, the object determiner 313 determines, among the at least one remaining object, an object for which the distance to the hand-held object in the captured image is less than the threshold as the target object. Then, the object determiner 313 determines a region in which the target object is present. The method by which the object determiner 313 determines the region in which the target object is present is substantially the same as the method by which the object determiner 313 determines the region in which the hand-held object is present.

The projection controller 320 prohibits the projection of virtual object V1 when the projection region R2 overlaps with at least one of the region in which the human body is present, the region in which the non-holding hand is present, the region in which the holding hand is present, the region in which the hand-held object is present, or the region in which the target object is present. The projection controller 320 obtains the region in which the target object is present from the object determiner 313.

According to the third modification, it is possible to reduce the projection of the virtual object V1 onto an object that is likely to be seen by the user together with the hand-held object. Therefore, it is possible to reduce visibility problems caused by the projection of the virtual object V1 onto the object that is likely to be visible to the user together with the hand-held object.

The threshold may be adjustable. In this case, the user may adjust the threshold in accordance with a use of the projection system 1. In an example, the user changes a default threshold (hereinafter referred to as a "reference value") in accordance with a use of the projection system 1.

The object determiner 313 may determine the type of the hand-held object in accordance with the recognition result by the recognizer 312. In this case, the object determiner 313 may set the threshold in accordance with the type of the hand-held object.

For example, when the hand-held object is a smartphone, the user is likely to see only the smartphone held in the hand. Therefore, even when the visibility of the remaining object is poor, the user will have little difficulty. Thus, when the hand-held object is a smartphone, the object determiner 313 makes the threshold less than the reference value. When the threshold is less than the reference value, the remaining object is less likely to be determined as the target object.

On the other hand, when the hand-held object is a pen, the user may be looking at a calendar near the pen in addition to the pen held in the hand in order to write text on the calendar with the pen. Therefore, when the visibility of an object (for example, a calendar) that is seen together with the pen among the remaining objects becomes poor, a problem for the user is likely to occur. Thus, when the hand-held object is a pen, the object determiner 313 makes the threshold greater than the reference value. When the threshold is greater than the reference value, the remaining object is more likely to be determined as the target object.

Thus, when the object determiner 313 sets the threshold in accordance with the type of the hand-held object, the projection of the virtual object V1 can be controlled as necessary.

B4: Fourth Modification

In the first embodiment, when the projection region R2 overlaps with at least one of the region in which the human body is present, the region in which the non-holding hand is present, the region in which the holding hand is present, or the region in which the hand-held object is present, the projection controller 320 stops providing the image information to the projection apparatus 10. As a result, it is possible to prevent the user from feeling uncomfortable due to the projection of the virtual object V1 onto the user's hand, arm, or the like.

However, to mainly solve the problem of the visibility of the hand-held object, the projection controller 320 may stop providing the image information to the projection apparatus 10 only when the projection region R2 overlaps with at least a part of the region in which the hand-held object is present. In this case, it is possible to omit the process of determining whether each of the human body and the non-holding hand is present in the captured image, and to omit the process of estimating each of the region in which the human body is present and the region in which the non-holding hand is present.

The process of determining whether only one of the human body and the non-holding hand is present in the captured image may be omitted, and the process of estimating the region, in which the one is present, in the captured image may be omitted.

B5. Fifth Modification

In the first embodiment, the projection controller 320 prohibits the projection apparatus 10 from projecting the virtual object V1, as a mode of prohibiting the projection apparatus 10 from projecting the virtual object V1 onto the hand-held object.

However, the projection controller 320 may change the projection region R2 of the virtual object V1 to a region that does not overlap with any of the region in which the human body is present, the region in which the non-holding hand is present, the region in which the holding hand is present, or the region in which the hand-held object is present.

For example, the projection controller 320 provides the projection apparatus 10 with image information that positions the projection region R2 of the virtual object V1 in the region that does not overlap with any of the region in which the human body is present, the region in which the non-holding hand is present, the region in which the holding hand is present, or the region in which the hand-held object is present.

Figure 7:
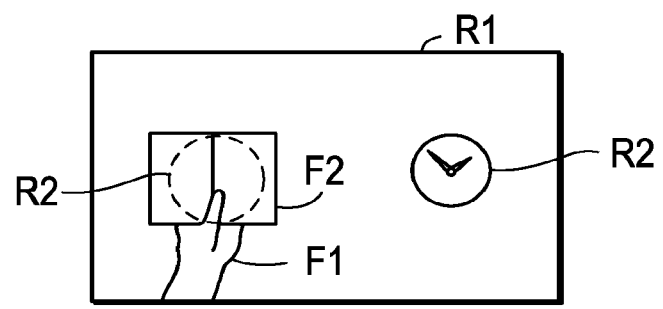
FIG. 7 is a diagram for explaining a fourth modification.

In an example, in a situation in which the virtual object V1 is projected as illustrated in FIG. 4, in response to the hand F1 holding the book F2 entering in the projection region R2 of the virtual object V1 as illustrated in FIG. 7, the projection region R2 of the virtual object V1 moves.

C. Other Matters (1) In each of the first embodiment and the first to fourth modifications, the storage apparatus 300 may include a flexible disk, a magnetooptical disk (e.g., a compact disk, a digital versatile disk, or a Blu-ray (registered trademark) disk), a smart card, a flash memory device (e.g., a card, a stick, or a key drive), a CD-ROM (Compact Disc-ROM), a register, a removable disk, a hard disk, a floppy (registered trademark) disk, a magnetic strip, a database, a server, or other suitable recording media. The program may be transmitted from a network via a telecommunication line.

(2) The information described in each of the first embodiment and the first to fourth modifications may be expressed by any one of various techniques. For example, data, information, and chips that can be mentioned in the overall description may be expressed by a voltage, a current, an electromagnetic wave, a magnetic field or magnetic particles, an optical field or a photon, or any combination thereof. It should be noted that the terms described in this specification and/or terms necessary for understanding this specification may be replaced by terms having the same or similar meanings.

(3) In each of the first embodiment and the first to fourth modifications, input and output information or the like may be stored in a specific location (e.g., a memory) or a management table. The input and output information can be overwritten, updated, or written with additional information. The output information may be deleted. The input information may be transmitted to another apparatus.

(4) In each of the first embodiment and the first to fourth modifications, the determination may be performed by a value (0 or 1) expressed as 1 bit, a Boolean value (true or false), or a comparison between numeric values (for example, a comparison with a predetermined value).

(5) In the procedures, sequences, and flowcharts of each of the first embodiment and the first to fourth modifications, the order may be changed, unless a conflict arises. For example, the method described in the specification presents various step elements in an exemplary order but is not limited to the presented specific order.

(6) Each function described in FIGS. 1, 2, and 6 is implemented by any combination of hardware and/or software. Each function may be implemented by a single device, or may be implemented by two or more separate devices.

(7) The program illustrated in each of the first embodiment and the first to fourth modifications should be widely interpreted as an instruction, an instruction set, a code, a code segment, a program code, a subprogram, a software module, an application, a software application, a software package, a routine, a subroutine, an object, an executable file, an execution thread, a procedure, a function, or the like, regardless of whether it is called software, firmware, middleware, microcode, hardware description language, or other names.

Software and commands may be transmitted and received via a transmission medium. For example, when the software is transmitted from a website, a server, or other remote sources using wired technology, such as a coaxial cable, fiber optic cable, twisted pair cable, or digital subscriber line (DSL), and/or wireless technology, such as infrared, wireless, or microwave technology, these wired and/or wireless technologies are included within the definition of the transmission medium.

(8) In each of the first embodiment and the first to fourth modifications, the terms "system" and "network" are used interchangeably.

(9) In each of the first embodiment and the first to fourth modifications, "in accordance with" does not mean "only in accordance with" unless otherwise specified. In other words, "in according to" means both "only in accordance with" and "at least in accordance with".

(10) Any reference to an element using the designation "first", "second", or the like used herein does not generally limit the quantity or order of these elements. These designations may be used herein as a convenient way of distinguishing between two or more elements. Accordingly, references to the first and second elements do not mean that only two elements may be employed therein, or that the first element must precede the second element in any way.

(11) As long as the terms "including", "comprising", and variations thereof are used in each of first embodiment and the first to fourth modifications in the specification or in the claims, these terms are, like the term "comprising", intended to be inclusive. In addition, the term "or" used in the specification or in claims is not intended to be an exclusive OR.

(12) In the disclosure, for example, when articles such as "a", "an", and "the" in English are added in translation, these articles include plurals unless otherwise clearly indicated by the context.

(13) It is obvious to those skilled in the art that the present invention is not limited to the embodiments described in the specification. The present invention can be implemented in modified and altered modes without departing from the spirit and scope of the present invention defined in accordance with the claims. Therefore, the description of this specification is for illustrative purposes only and is not meant to be in any way limiting to the present invention. In addition, a plurality of modes selected from the modes illustrated the specification may be used in combination.

DESCRIPTION OF REFERENCE SIGNS

1 . . . Projection system, 10 . . . Projection apparatus, 20 . . . Imaging capture apparatus, 30 . . . Projection control apparatus, 300 . . . Storage apparatus, 302 . . . Processing apparatus, 310 . . . Determiner, 311 . . . Outputter, 312 . . . Recognizer, 313 . . . Object determiner, 320 . . . Projection controller, M1-M3, T1-TN . . . Trained model, SG1, SG2 . . . Segmenter, and 40 . . . Measurement apparatus.

The invention claimed is:

1. A projection controlling apparatus comprising:
processing circuitry configured to
determine whether a hand-held object that is an object held by a hand is present in a captured image represented by captured image data generated by capturing a projection region onto which a projector projects a projected image, the hand-held object being a device with a display or including viewable or readable content; and
prohibit the projected image from being projected onto the hand-held object in the projection region in response to a determination by the processing circuitry that the hand-held object is present in the captured image.

2. The projection controlling apparatus according to claim 1, wherein
the processing circuitry being further configured to:
output a determination result as to whether a holding hand that is the hand holding the object is present in the captured image;
recognize a plurality of target recognition objects differing from the hand by using the captured image data, the plurality of target recognition objects being present in the captured image, each of the plurality of target recognition objects being a device with a display or including viewable or readable content; and
determine, from among the plurality of target recognition objects, an object of which distance to the holding hand is shortest to be the hand-held object in response to the determination result indicative of the holding hand being present in the captured image.

3. The projection controlling apparatus according to claim 2, wherein the processing circuitry is configured to determine, from among the plurality of target recognition objects, the object for which distance to the holding hand is shortest to be the hand-held object in accordance with a measurement result that is indicative of a distance to the holding hand, a measurement result that is indicative of a distance to each of the plurality of target recognition objects, and the captured image data.

4. The projection controlling apparatus according to claim 2, wherein
the processing circuitry is further configured to
determine a nearest object for which distance to the hand-held object is shortest from among at least one remaining object that is at least one object other than the hand-held object among the plurality of target recognition objects, and
prohibit the projected image from being projected onto the nearest object in the projection region.

5. The projection controlling apparatus according to claim 2, wherein
the processing circuitry is further configured to
determine a target object of which distance to the hand-held object is less than or equal to a threshold from among at least one remaining object that is at least one object other than the hand-held object among the plurality of target recognition objects, and
prohibit the projected image from being projected onto the target object in the projection region.

6. The projection controlling apparatus according to claim 5, wherein
the processing circuitry is further configured to:
determine a type of the hand-held object; and
set the threshold in accordance with the type of the hand-held object.

7. The projection controlling apparatus according to claim 2, wherein
the processing circuitry is further configured to:
input the captured image data to a trained model having been trained to learn a relationship between image data and determination data indicating whether the holding hand is present in an image indicated by the image data; and
use output data of the trained model as the determination result.

8. The projection controlling apparatus according to claim 1, wherein the projected image represents a virtual object that realizes an augmented reality.

9. A projection system comprising:
a projector configured to project a projected image on to a projection region;
an image capturer configured to generate captured image data by capturing the projection region; and
processing circuitry configured to
determine whether a hand-held object that is an object held by a hand is present in a captured image represented by the captured image data, the hand-held object being a device with a display or including viewable or readable content; and
prohibit the projected image from being projected onto the hand-held object in the projection region in response to a determination by the processing circuitry that the hand-held object is present in the captured image.

* * * * *